(12) United States Patent
Brülle-Drews

(10) Patent No.: US 9,918,165 B2
(45) Date of Patent: Mar. 13, 2018

(54) CONFIGURABLE INFORMATION DISTRIBUTION SYSTEM FOR A VEHICLE

(75) Inventor: Christian Brülle-Drews, Hamburg (DE)

(73) Assignee: HARMAN BECKER AUTOMOTIVE SYSTEMS-GMBH, Karlsbad (DE)

( * ) Notice: Subject to any disclaimer, the term of this patent is extended or adjusted under 35 U.S.C. 154(b) by 1644 days.

(21) Appl. No.: 11/456,761

(22) Filed: Jul. 11, 2006

(65) Prior Publication Data

US 2007/0127734 A1    Jun. 7, 2007

Related U.S. Application Data

(63) Continuation-in-part of application No. 11/322,371, filed on Dec. 29, 2005, now abandoned, which is a continuation of application No. PCT/EP2004/007113, filed on Jun. 30, 2004.

(30) Foreign Application Priority Data

Jun. 30, 2003    (EP) .................................. 03014856

(51) Int. Cl.
```
H04R 5/04      (2006.01)
H04B 1/20      (2006.01)
H04R 25/00     (2006.01)
```
(52) U.S. Cl.
CPC ............... *H04R 5/04* (2013.01); *H04B 1/207* (2013.01); *H04R 25/43* (2013.01); *H04R 2420/01* (2013.01); *H04R 2420/03* (2013.01); *H04R 2499/13* (2013.01)

(58) Field of Classification Search
CPC ...... H04R 5/04; H04R 25/43; H04R 2420/01; H04R 2420/03; H04R 2499/13; H04B 1/207
USPC .......... 700/94; 381/86, 77, 80, 81, 104, 105, 381/109, 119; 725/75, 76, 77
See application file for complete search history.

(56) References Cited

U.S. PATENT DOCUMENTS

| | | | |
|---|---|---|---|
| 2,118,848 A | | 5/1938 | Leigh |
| 2,908,766 A | * | 10/1959 | Taylor .............................. 381/79 |
| 3,063,756 A | | 11/1962 | Skantar |
| 3,103,634 A | | 9/1963 | Nelson et al. |
| 4,435,845 A | | 3/1984 | Timm et al. |
| 4,879,751 A | * | 11/1989 | Franks et al. ................. 381/119 |
| 5,661,811 A | | 8/1997 | Huemann et al. |
| 5,757,941 A | | 5/1998 | McMillen |
| 5,761,320 A | * | 6/1998 | Farinelli ............... H04M 1/723 |
| | | | 379/101.01 |
| 5,910,996 A | * | 6/1999 | Eggers et al. ................ 381/107 |
| 5,983,087 A | * | 11/1999 | Milne et al. ................... 455/149 |

(Continued)

FOREIGN PATENT DOCUMENTS

| | | |
|---|---|---|
| DE | 10057261 | 5/2002 |
| EP | 1 494 364 A1 | 1/2005 |

(Continued)

*Primary Examiner* — Davetta W Goins
*Assistant Examiner* — Daniel Sellers
(74) *Attorney, Agent, or Firm* — Artegis Law Group, LLP

(57) ABSTRACT

An information distribution system enhances a vehicle audio/video system. The system flexibly delivers audio and video, potentially obtained from many different sources, to different locations in the vehicle. Each passenger receives the audio or video that is of interest to them without distracting interruptions.

16 Claims, 9 Drawing Sheets

(56) References Cited

U.S. PATENT DOCUMENTS

| | | | |
|---|---|---|---|
| 6,282,491 B1 | 8/2001 | Bochmann et al. | |
| 6,360,187 B1* | 3/2002 | Hermann | 702/191 |
| 6,526,460 B1 | 2/2003 | Dauner et al. | |
| 6,674,865 B1* | 1/2004 | Venkatesh et al. | 381/107 |
| 6,678,892 B1* | 1/2004 | Lavelle et al. | 725/75 |
| 7,076,204 B2* | 7/2006 | Richenstein et al. | 455/3.06 |
| 7,085,710 B1* | 8/2006 | Beckert et al. | 704/201 |
| 7,092,531 B2* | 8/2006 | Enya et al. | 381/86 |
| 7,158,842 B2* | 1/2007 | Ohmura et al. | 700/94 |
| 7,269,434 B2* | 9/2007 | Tabata et al. | 455/519 |
| 7,558,635 B1* | 7/2009 | Thiel et al. | 700/94 |
| 2002/0118848 A1 | 8/2002 | Karpenstein | |
| 2002/0196134 A1 | 12/2002 | Lutter et al. | |
| 2003/0063756 A1* | 4/2003 | Geerlings et al. | 381/86 |
| 2003/0081796 A1* | 5/2003 | Bray et al. | 381/86 |
| 2003/0091069 A1* | 5/2003 | Kraemer et al. | 370/487 |
| 2003/0152243 A1* | 8/2003 | Julstrom et al. | 381/315 |
| 2004/0078104 A1* | 4/2004 | Nguyen | H03G 3/3078 |
| | | | 700/94 |
| 2005/0271219 A1* | 12/2005 | Bruelle-Drews | 381/86 |
| 2006/0262935 A1* | 11/2006 | Goose | H04S 3/002 |
| | | | 381/17 |

FOREIGN PATENT DOCUMENTS

| | | |
|---|---|---|
| WO | WO 2000/10311 | 2/2000 |
| WO | WO 2005/004360 A1 | 1/2005 |

* cited by examiner

CONFIGURABLE INFORMATION DISTRIBUTION SYSTEM FOR A VEHICLE

PRIORITY CLAIM

This application is a continuation-in-part application of U.S. patent application Ser. No. 11/322,371, filed Dec. 29, 2005, now abandoned which is a continuation of International Application No. PCT/EP2004/007113 filed Jun. 30, 2004, which claims priority to European Patent Application No. 03014856.3, filed Jun. 30, 2003, all of which are entirely incorporated by reference herein.

BACKGROUND OF THE INVENTION

1. Technical Field

The invention relates to information distribution in a vehicle. In particular, this invention relates to a configurable information distribution system that distributes audio and video information among multiple outputs.

2. Related Art

Rapid advancements in technology have lead to the widespread adoption of extensive audio, video, communication, and information systems in vehicles. The systems provide information both acoustically and visually. The systems fill a wide range of roles, including navigation assistance, traffic reporting, wireless telephony, vehicle status reporting, music playback, video playback, and video gaming.

The systems output information to the displays and speakers that the vehicle provides for the use and enjoyment of the passengers. At times, information from different audio sources is output simultaneously. For example, a navigation system announcement may be made while audio signals accompanying DVD playback play through rear speakers for the occupants of the back seat. In the past, the amplitude of the audio signals was lowered with respect to the amplitude of the audio signal from the navigation system, or the audio signals were completely faded out, so that the driver could hear the navigation system announcement.

Indiscriminately fading the audio signal adversely impacts the use and enjoyment of vehicle's audio/visual system. The passengers listening to and watching the DVD playback are generally not interested in the announcements of the navigation system. Nevertheless, the passengers have their attention diverted to the navigation announcements and away from the DVD playback.

SUMMARY

The information distribution system enhances the use and enjoyment of the vehicle audio/visual system. The system flexibly delivers audio and video to vehicle passengers based on passenger preferences. Accordingly, each passenger receives the audio or video they desire tailored to their preferences without distracting interruptions. The system accepts audio or video from multiple sources and selectively mixes and routes the audio and video to multiple destinations such as front and rear vehicle speakers or multiple displays.

The information distribution system includes an input interface and output channels that connect to audio/video output devices distributed around the vehicle. The input interface receives audio data from multiple sources, such as a DVD player, radio, or navigation system. The system flexibly distributes the audio and video among the output channels.

To that end, the system stores configurable preference settings. The preference settings may specify audio/video distribution preferences that establish, for any combination of output channels and information sources, which data to deliver to which output channel. Furthermore, the system stores scaling preferences and mixing preferences for the audio/video data and a mixer combines the audio/video data, scaled according to the scaling preferences, obtained from the information sources into a mixed output A router in the system distributes the mixed output among the output interfaces according to the distribution preferences.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
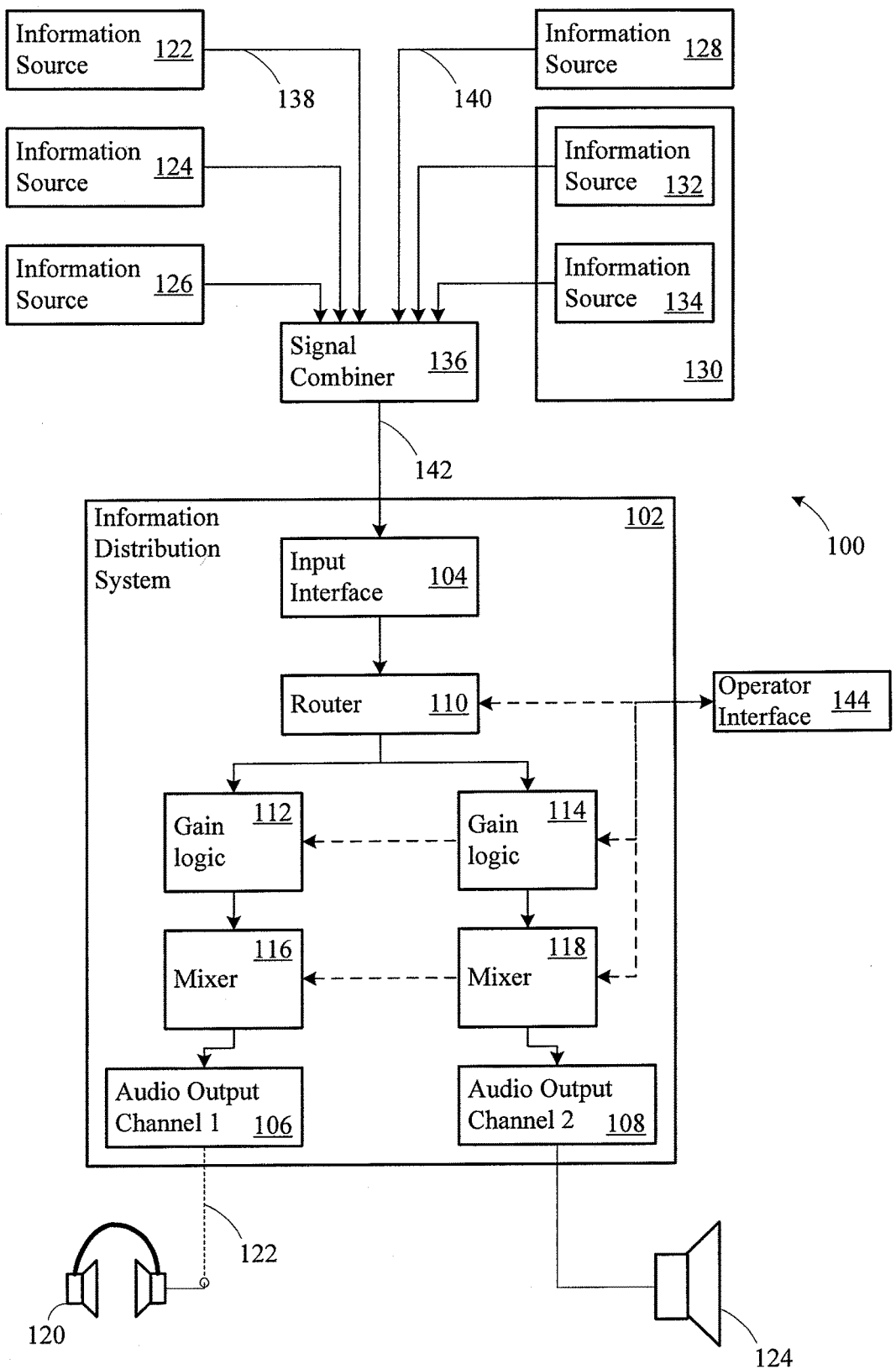
FIG. 1 shows a configurable information distribution system.

FIG. 1 shows a vehicle audio/visual system 100 that includes a configurable information distribution system ("system") 102. The system 102 includes an input interface 104, audio output channels 106 and 108, and a router 110. The system 102 also includes gain logic 112 and 114 and mixers 116 and 118.

A headset 120 connects to the audio output channel 106 through a wireless connection 122. A speaker system 124 connects to the audio output channel 108. The speaker system 124 may be implemented as one or more speakers distributed throughout the vehicle.

FIG. 1 also shows information sources 122, 124, 126, 128, 130, 132, and 134. Any information source 122-134 may provide one or more audio or video data streams. The information source 130, for example, includes two information sources 132 and 134 that provide individual audio/video data streams. The information source 130 may be a radio in which the information source 132 generates audio data for music and news programs, while the information source 134 generates audio data for traffic information. The information sources 132 and 134 may be independent radio tuners, tuners that decode and separate AM/FM radio signals and an accompanying Radio Data Service (RDS) signal or Subsidiary Communications Authority (SCA) signal, or other types of logic.

The information sources 122-134 may include a television receiver, a radio receiver, a compact cassette (CC) player, a compact disk (CD) player, a super audio compact disk (SACD) player, a digital versatile disk (DVD) player, or other information source. Other examples of information sources 122-134 include a personal computer, a video game console, a telephone (whether mobile or fixed), a navigation system, an onboard computer, or a microphone. The number of information sources 122-134 may vary depending on the implementation.

The system 102 connects to a signal combiner 136. The signal combiner 136 merges the audio/visual data streams (e.g., the audio streams 138 and 140). The signal combiner 136 may be a time or frequency multiplexer or other time and/or frequency combining logic. The signal combiner 136 forms a combined data stream 142. The combined data stream 142 enters the system 102 through the input interface 104.

Figure 2:
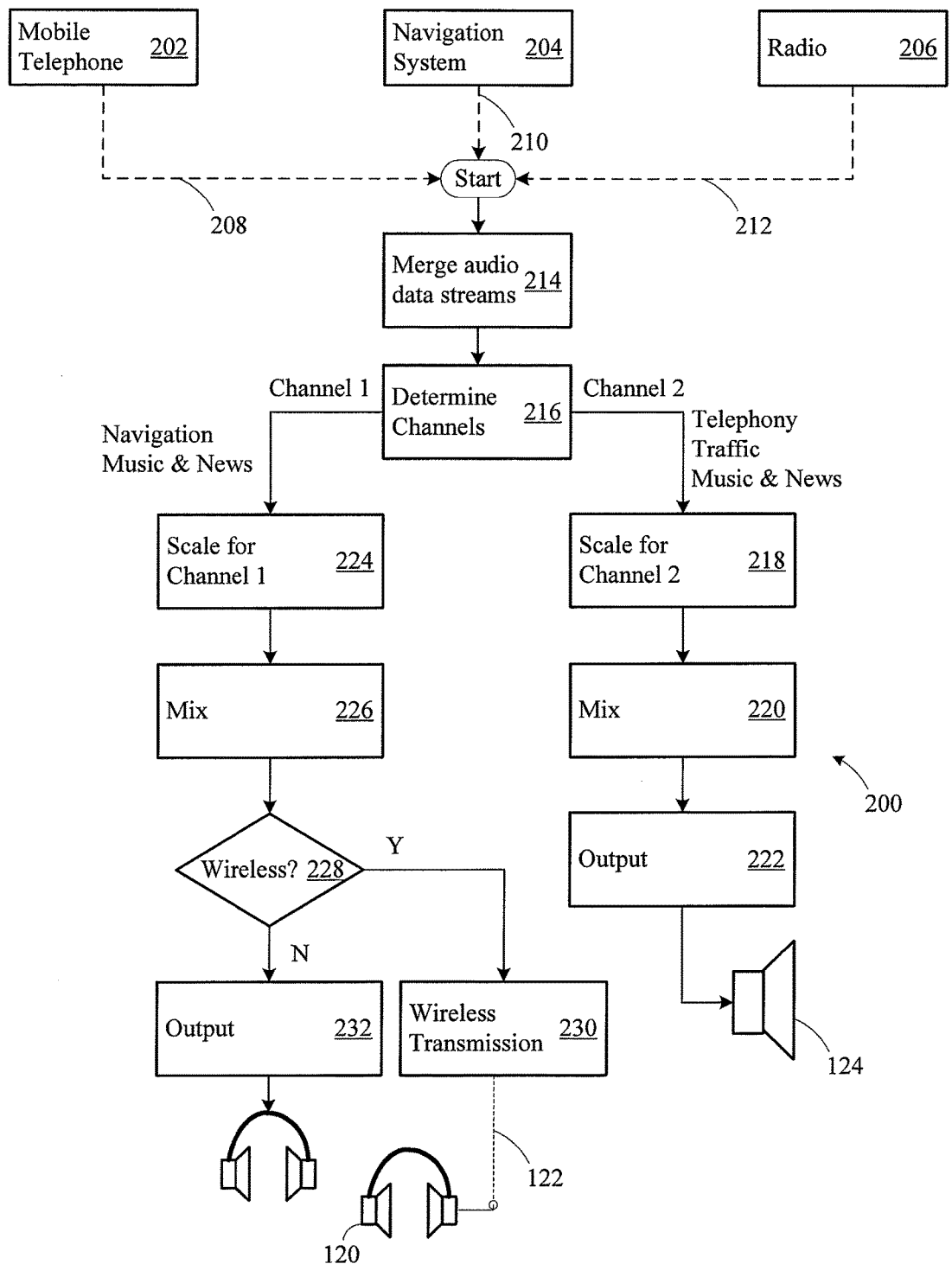
FIG. 2 shows a flow diagram illustrating the acts that a configurable information distribution system may take to selectively route information to vehicle passengers.

FIG. 2 shows a flow diagram 200 illustrating how the information distribution system 102 selectively routes information to vehicle passengers. FIG. 2 shows three information sources: a mobile telephone 202, a navigation system 204, and a radio 206. The mobile telephone 202, navigation system 204, and radio 206 provide different audio data streams: a telephony data stream 208, a navigation data stream 210, and a radio data stream 212, respectively, to the system 102.

The signal combiner 136 merges the data streams 208-212 (Act 214), for example by time multiplexing data from each of the data streams 208-212 into a combined data stream. The combined data stream thereby includes data sequences of audio information obtained from the mobile telephone 202, navigation system 204, and radio 206. During merging, the signal combiner 136 may add predefined source identifiers, headers, or other distinguishing information to the merged data stream. The distinguishing information may be stored in a memory for retrieval and insertion into the merged data stream by the signal combiner 136. The identifiers may specify the origin (e.g., the mobile telephone 202) of each data sequence, the length of the data sequence, or any other characteristic of the data sequence. The combined data stream enters the system 102 through the input interface 104.

The system 102 determines which data sequences in the combined data stream to deliver to which output channels (Act 216). In the example shown in FIG. 2, the system 102 directs the navigation data stream 210 to the first audio output channel 106, and to the headset 120 connected to the first audio output channel 106. Furthermore, the system 102 directs the telephony data stream 208 and the traffic information in the radio data stream 212 to the second audio output channel 108. The system 102 directs the music and news programs in the radio data stream 212 to both the first audio output channel 106 and the second audio output channel 108.

The router 110 may deliver any portion of the input data streams to any of the output channels. The system 102 may store configurable distribution preferences that specify which data streams (e.g., the radio data stream), and what types of data in the data stream (e.g., news or music) are destined for which output channels. The system 102 may store the configurable distribution preferences in a memory, such as in a routing table in the router 110. The system 102 may accept input from vehicle passengers through an operator interface 144 that establishes or changes the audio distribution preferences.

The gain logic 114 scales the data sequences destined for the second audio output channel 108 (Act 218). The system 102 may store scaling preferences that specify the magnitude of attenuation or gain applied to the data sequences. The system 102 may accept input from vehicle passengers through a user interface that establishes or changes the scaling preferences. For example, a passenger may establish a scaling preference that reduces music volume, while keeping telephone volume constant. The scaling preferences may specify that a particular audio type and/or audio source will be completely faded out, or may specify that no change will be made to a particular audio type and/or audio source.

The mixer 118 mixes the scaled data sequences (Act 220) to produce a mixed audio output that includes the telephony information, the traffic information, and the music and news. The telephony information, the traffic information, and the music and news are weighted according to the scaling preferences to tailor the audio output to the passenger preferences, to meet default system preferences, or to meet any other preferences established in the system 102. The system 102 outputs the mixed audio output to the speaker system 124 (Act 222) through the second audio output channel 108.

The gain logic 112 scales the data sequences destined for the first audio output channel 106 (Act 224). The mixer 116 mixes the scaled data sequences (Act 226) to generate a mixed audio output for the first output channel 106. The gain logic 112 may also operate responsive to scaling preferences, default preferences, or other settings.

The system 102 determines whether the mixed audio output may be delivered wirelessly (Act 228), for example by reading system configuration data or operator preference data. Alternatively or additionally, the system 102 may automatically detect and communicate with wireless devices that adhere to an established communication protocol, such as the Bluetooth protocol. When wireless transmission is available, the system 102 initiates wireless transmission of the mixed audio output (Act 230). The system 102 may also output the mixed audio output through the first output channel 106 to a device that is not wirelessly connected to the first output channel 106 (Act 232).

The system 102 may transmit to wireless headphones, hearing aids with a telecoil, or to other wireless devices. For example, a passenger may provide input to the system 102 that specifies that the passenger wears a wireless receiver (e.g., a telecoil equipped hearing aid). The system 102 may check the system input, determine that the passenger has selected wireless transmission to the hearing aid, and wirelessly transmit to the passenger. In doing so, the system 102 may convert the mixed audio output into magnetic field variations to induce a signal in the conductive wire loops in the telecoil. One advantage is that background noise is significantly suppressed because the telecoil responds to the magnetic field variations and not to sound vibrations. Thus, the passenger can better understand the information in the combined output.

Figure 3:
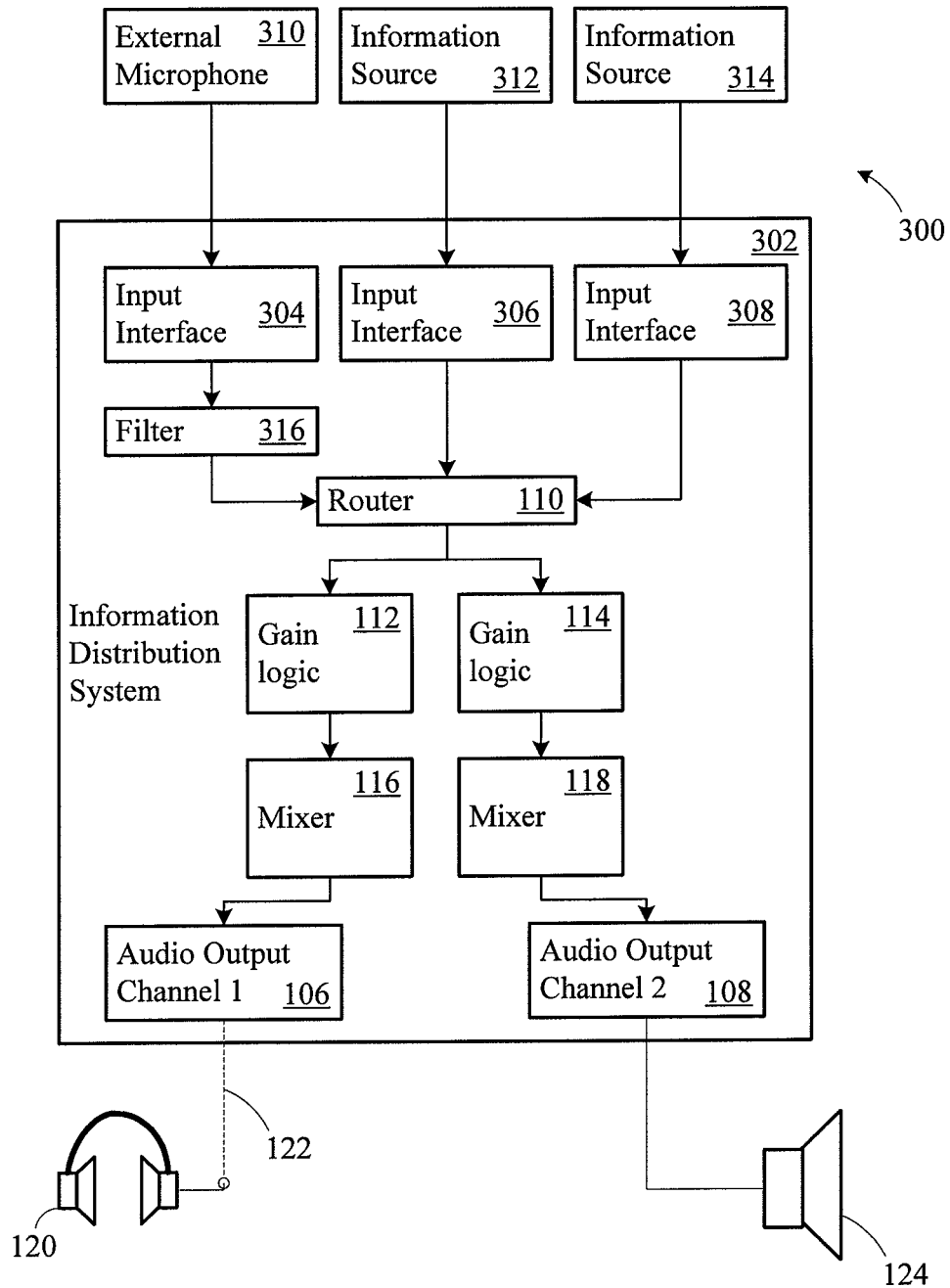
FIG. 3 shows a configurable information distribution system.

FIG. 3 shows a vehicle audio/visual system 300 that includes a configurable information distribution system ("system") 302. The system 302 includes an input interface 304, 306, and 308 for each information source 310, 312, and 314. Thus, three data streams enter the system 302 in parallel. Furthermore, the system 302 includes a filter 316 connected to the input interface 304. Additional filters may be provided for the other input interfaces 306 and 308. Alternatively, the filter 316 may filer the data streams received on the input interfaces 306 and 308. The filter 316 may be a noise filter, an echo cancellation filter, or any other type of filter.

In one implementation, the information source 310 includes an external environmental sensor, such as an external microphone. The microphone may capture sound outside of the vehicle, including noise of interest (e.g., signal horns or emergency sirens), but also noise that is not of interest (e.g., motor noise or road noise). The system 302 may configure the filter 316 to attenuate, suppress, or remove the noise that is not of interest. As a result, the passenger may receive noise that is of interest from outside the car, thereby informing the passenger of important environmental conditions (e.g., a passing ambulance).

Figure 4:
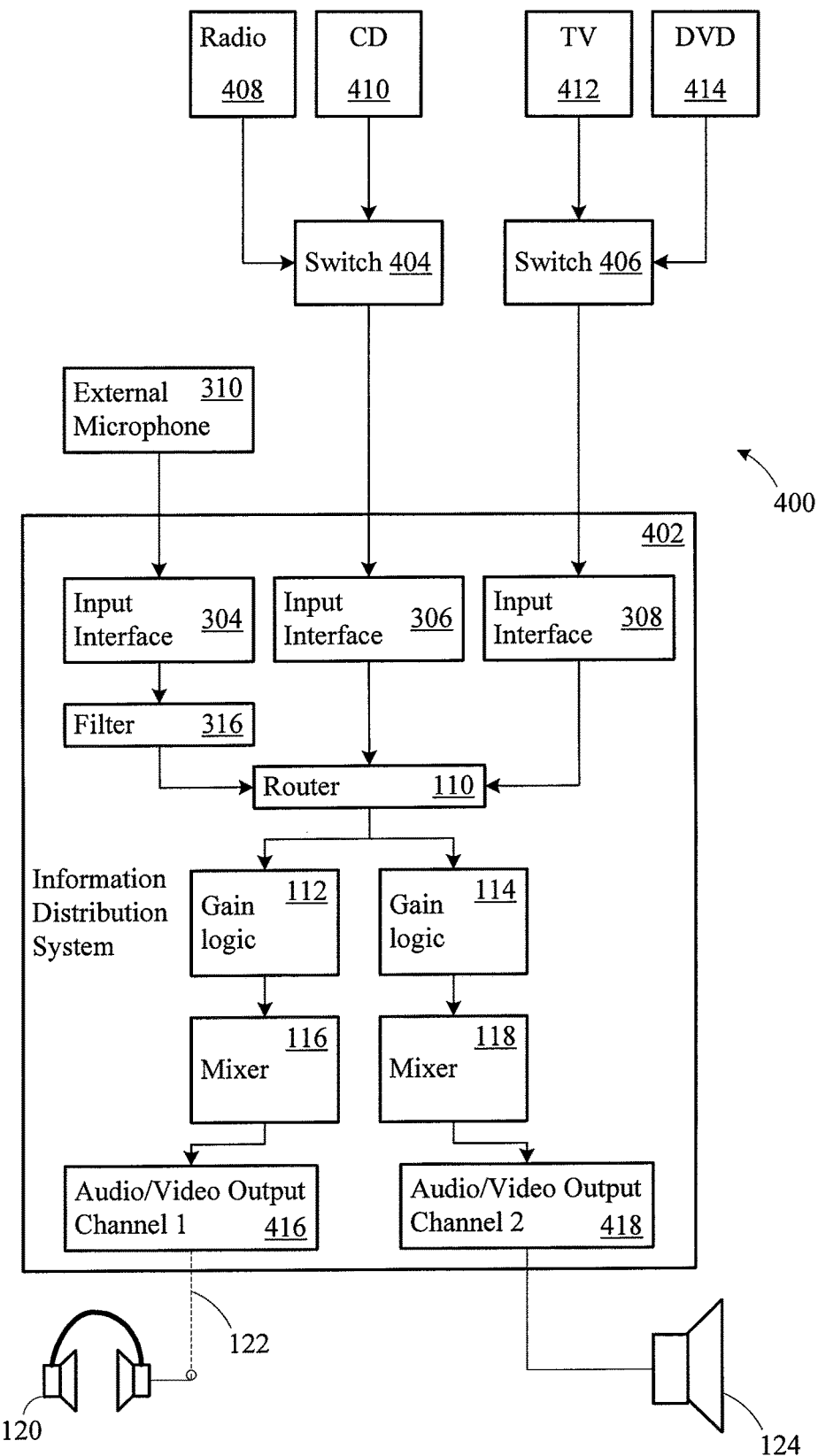
FIG. 4 shows a configurable information distribution system with input switching.

FIG. 4 shows a vehicle audio/visual system 400 that includes a configurable information distribution system ("system") 402 with input switching. In particular, the system 402 includes switches such as the audio input switch 404 and video input switch 406. The switches 404 and 406 may be manually actuated switches, electronic switches under control of the system 402 or other vehicle system, or other types of data selectors. The audio input switch 404 provides a selection between any number of audio information sources. The information sources may include the radio 408 and super audio CD player 410 shown in FIG. 4, a compact cassette player, or any other audio information source.

The video switch 406 provides a selection between any number of video information sources. The information sources may include a TV 412, a DVD player 414, or any other source of a video data stream. A passenger may determine which of the video information sources to view by manually controlling the video input switch 406, by setting passenger viewing preferences, by providing video selection input through an operator interface in the vehicle, or in another manner.

The system 402 selectively routes the video data streams between the first audio/video output channel 416 and the second audio/video output channel 418. The audio/video output channels 416 and 418 may include audio/video connectors, wireless transmitters, or other audio and video output logic. The system 402 may establish and maintain video distribution preferences and video mixing preferences. The video distribution preferences may specify one or more output channels to which to route any particular input video data stream. For example, a passenger viewing a front seat LCD display connected to the first audio/video output channel 416 may view the DVD video data stream, while a passenger viewing a rear seat LCD display connected to the second audio/video output channel 418 may receive a combined TV and DVD video stream. The video mixing preferences may establish, for any output channel, how the system 402 will merge the video data streams. The video mixing preferences may establish that the video data streams should be merged into a split-screen display or a picture-in-picture display, and may specify the dimensions, position, or other characteristic of the picture-in-picture display, video brightness or contrast, or any other video mixing characteristic.

Figure 5:
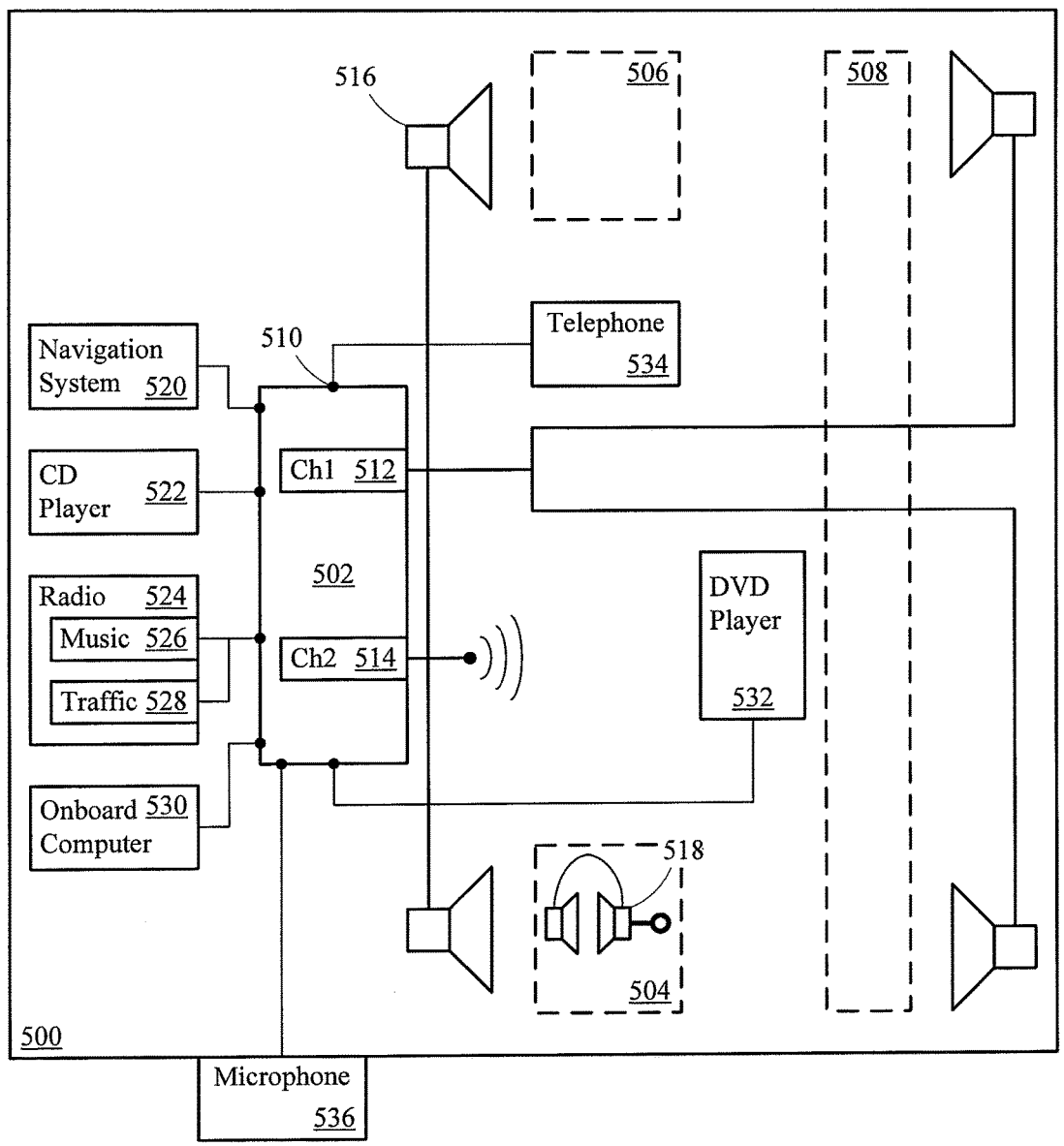
FIG. 5 shows a configurable information distribution system in a vehicle.

FIG. 5 shows a vehicle 500 including a configurable information distribution system ("system") 502. The system 502 centrally gathers and distributes audio information to different locations in the vehicle. Schematically drawn in dotted lines are the driver's seat 504, the front passenger seat 506 and the back seat 508. In the example shown in FIG. 5, the system 502 includes seven input interfaces (e.g., the telephone input interface 510), a first audio output channel 512 and a second audio output channel 514. The first audio output channel 512 connects to the speakers 516 and the second audio output channel 514 wirelessly communicates with the headset 518.

A navigation system 520 connects to one of the input interfaces. A CD player 522 is also connected a input interface. In addition, FIG. 5 shows a radio 524 connected to a third input interface. The radio 524 includes two audio data sources: the music program data source 526 and the traffic information data source 528. Additional information sources include an onboard computer 530 and a DVD player 532 provided for the occupants of the back seat 508.

In addition, FIG. 5 shows a telephone 534 connected to the system 502. Additionally or alternatively, the passenger may connect a personal computer or any other information source to the system 502. FIG. 5 also shows that the system 502 receives en audio data stream from an external microphone 536. Additional, fewer, or different information sources may connect to the system 502. Furthermore, the system 502 may determine that an information source is not allowed to provide input to the system 502 because of time/date, user preference, or other constraints. For disallowed information sources, the system 502 may refuse requests to route information from that information source to any destination. Similarly, the system 502 may implement additional, fewer, or different output channels (e.g., an output channel for independent control over each speaker 516).

In another implementation, the system 502 accepts input from more than one external microphone in order to enhance reception of noise of interest outside the vehicle. Additionally or alternatively, the system 502 may accept input from an internal microphone. The internal microphone may be an inter-vehicle communication device that the passengers use to improve communication in the vehicle. The system 502 may also employ the internal microphone to control the amplitude of the audio signals that the system 502 distributes to the output channels 512 and 514. For example, the system 502 may adjust the amplitude as a function of background noise level inside the car that is detected by the internal microphone. When background noise increases, the system 502 may increase the amplitude of the audio signal sent to either output channel 512 and 514.

Audio distribution preferences, scaling preferences, default configuration, or other configuration information may determine which output channels receive audio data from the information sources. As an example, the system 502 may route audio data from the CD player 522, DVD player 532, and the music program data source 526 to the speakers 516. Thus, the occupants of the front passenger seat 506 and/or the back seat 508 may enjoy the chosen entertainment programs without being annoyed or distracted by announcements arriving from the other information sources.

The driver, using the headset 518, may receive navigation information from the navigation system 520, traffic information from traffic information data source 528, telephone calls via the telephone 524, and information captured by the external microphone 536. The configuration information may also direct the system 502 to provide audio signals from the entertainment sources such as the CD player 522, the music program data source 526, or the DVD player 532.

The configuration of the system 502 may change at any time. For example, the system 502 may accept input from a user interface that establishes or changes any of the distribution preferences, scaling preferences, default routing or mixing preferences, or other system parameters. Accordingly, any passenger may reconfigure the system 502 so that the passenger receives selected information, mixed and delivered according to individual preferences.

Figure 6:
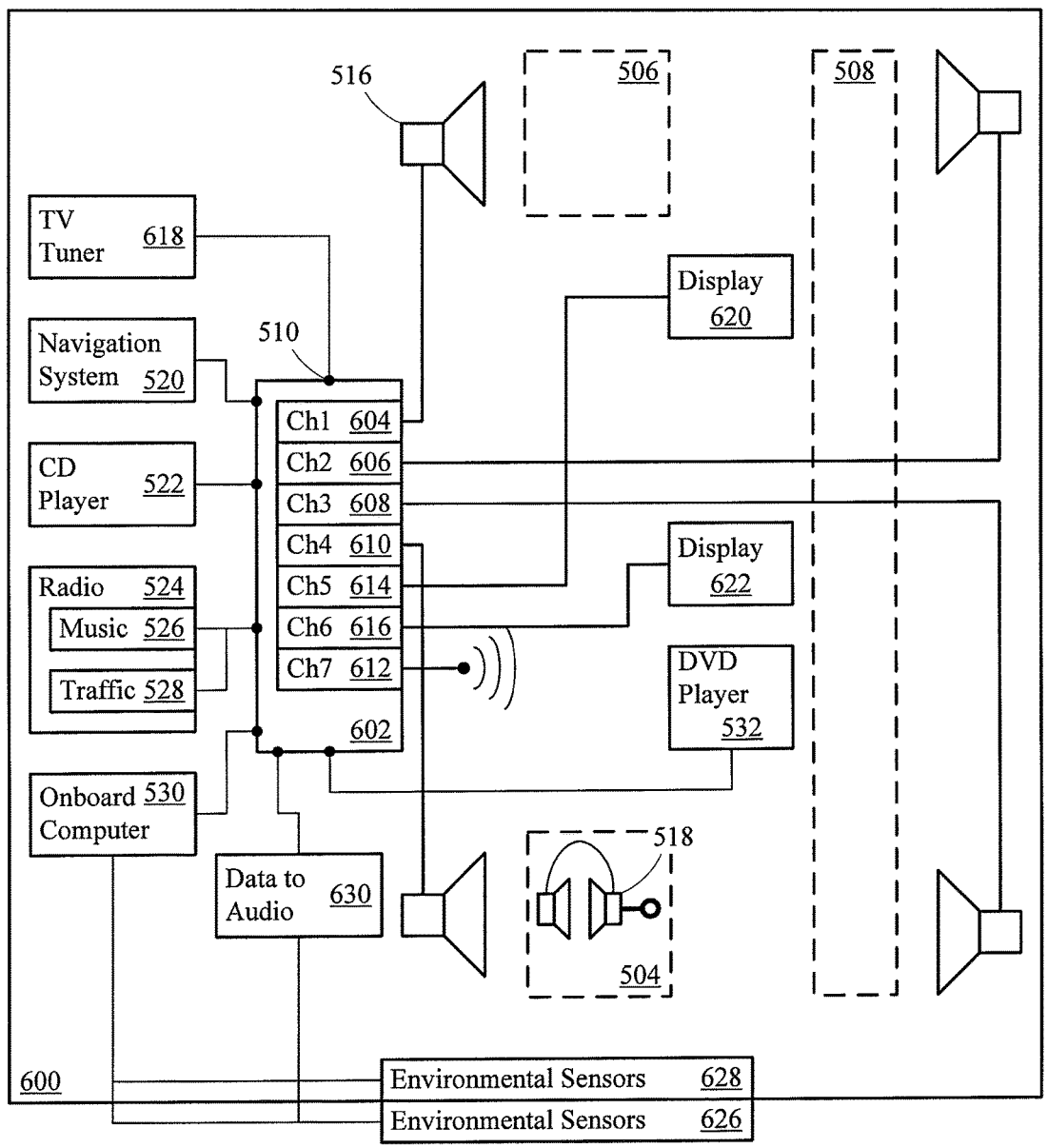
FIG. 6 shows a configurable information distribution system in a vehicle.

FIG. 6 shows a vehicle 600 including a configurable information distribution system ("system") 602. The system 602 centrally gathers and distributes audio and video information to different destinations in the vehicle. The system 602 includes seven output channels: the five audio output channels 604, 606, 608, 610, and 612, and the two video output channels 614 and 616. Video data streams arrive from the TV Tuner 618 and the DVD player 532. The system 602 mixes and routes the video data streams between the displays 620 and 622.

Video mixing preferences and video distribution preferences may determine how the system 602 delivers the video data streams to the displays 620 and 622. For example, the video distribution preferences may direct the system 602 to send both the DVD video data and the TV tuner video data to the display 620 through the video output channel 614, while sending only the DVD video data to the display 622 through the video output channel 616. With regard to the output channel 614, the video mixing preferences may direct the system 602 to output, for example, a mixed video data stream in which the DVD video appears in the foreground, with the TV tuner data in a picture-in-picture window.

FIG. 6 also shows external environmental sensors 626 and internal environmental sensors 628. The environmental sensors 626 and 628 may be microphones, temperature sensors, humidity sensors, directional sensors, carbon monoxide sensors, acceleration sensors, wind speed or direction sensors, or any other type of sensor. The environmental sensors 626 and 628 generate sensor data (e.g., representative of the outside temperature), Data-to-audio conversion logic 630 may be provided to convert the sensor data to an audio data sequence. As examples, the data-to-audio conversion logic 630 may be a data-to-speech converter, a text-to-speech converter, a speech data system (SDS), or a data-to-tone converter. The audio data sequence may convey the sensor data in spoken form, as tones (e.g., an emergency warning tone or tone sequence), or in another audible form. Additionally or alternatively, the data-to-audio conversion logic 630 may implement a data-to-text converter for displaying information in a readable form to the passengers. The 602 system routes, amplifies or attenuates, mixes, and/or outputs the audio data sequences from the data-to-audio conversion logic 630 to any selected output channel. The data-to-audio conversion logic 630 may also receive input from other information sources, such as Short Message Service (SMS) receivers that receive navigation, traffic, emergency, or other information.

Alternatively or additionally, the onboard computer 530 may process the sensor data. The onboard computer 530 may implement noise reduction processing, such as noise cancellation or echo cancellation processing employing the sensor data (e.g., internal and external microphone data). The onboard computer 530 may also convert the data to audible form and provide a resultant audio sensor data stream to any of the input interfaces 510.

Figure 7:
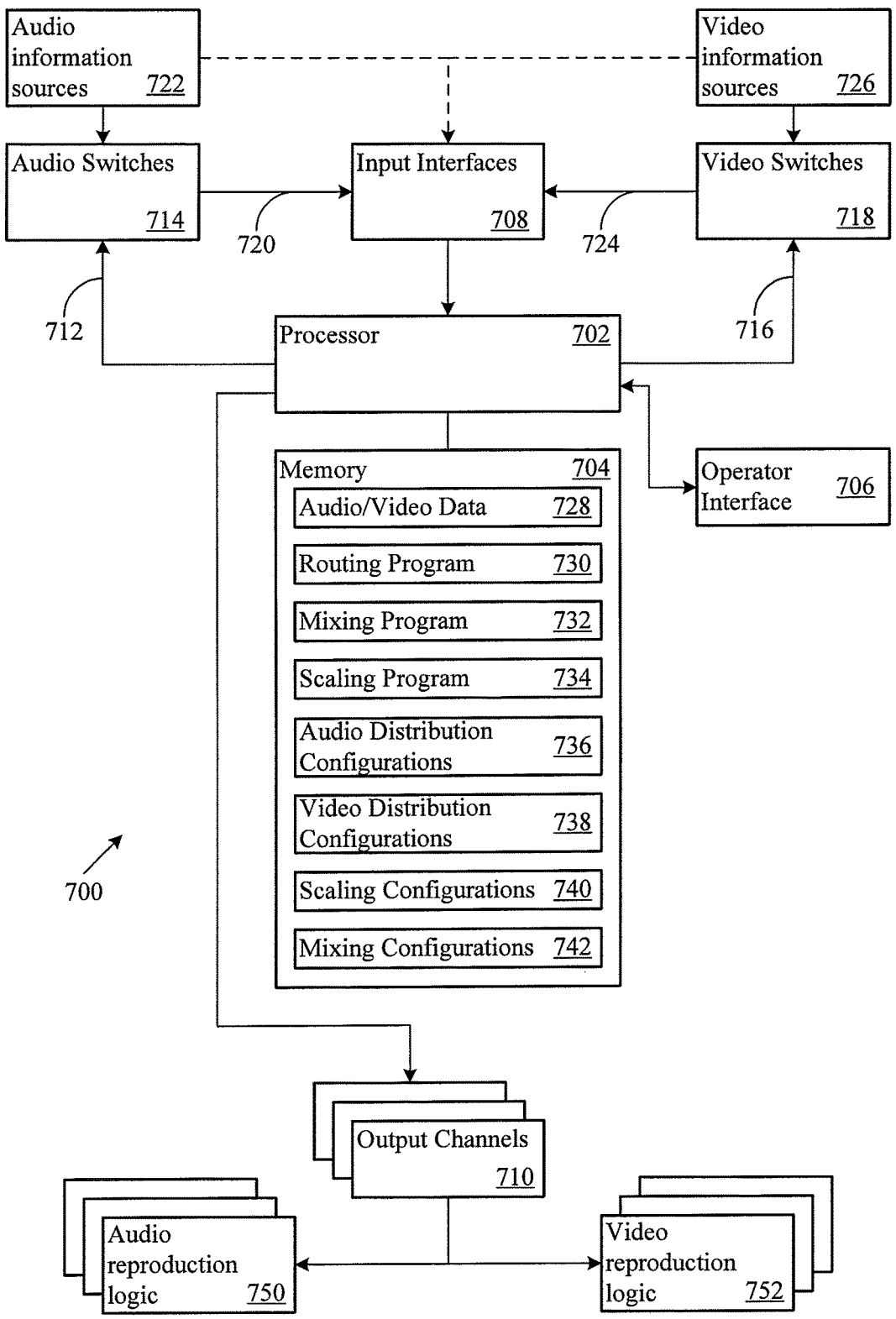
FIG. 7 shows a configurable information distribution system.

FIG. 7 shows a configurable information distribution system ("system") 700. The system 700 includes a processor 702, a memory 704, and an operator interface 706. The system also includes input interfaces 708 and output channels 710. The input interfaces 708 and output channels 710 may include serial data bus interfaces, parallel data bus interfaces, vehicle bus interfaces, packet switched network interfaces, optical fiber interfaces, wireless transmission interfaces, analog or digital video or audio interfaces, or other types of interfaces. The processor 702 controls an audio switch control output 712 connected to the audio switches 714 and a video switch control output 716 connected to the video switches 718.

The system 700 receives audio data streams 720 from the audio information sources 722. Video data streams 724 arrive from the video information sources 726. Any of the audio data streams 720 and video data streams 724 may connect directly to the input interfaces 708 instead of connecting through the audio switches 714 and video switches 718.

The memory 704 stores audio/video data 728 received from the audio and video information sources 722 and 726. The routing program 730 determines the output channels 710 to which to distribute the audio and video data 728. The mixing program 732 mixes the audio and video data 728 to form a mixed audio output and/or a mixed video output for delivery to the output channels 710. The scaling program 734 applies gains to the audio data, and may apply brightness, contrast, or other image control over the video data 728.

The programs 730-734 may operate according to default system settings, or according to configurable preference settings. The system 700 may accept operator preferences through the operator interface 706 and responsively establish preference settings. The operator interface 706 may include a voice recognition system, a keypad, a touch sensitive display, or any other interface.

The memory 704 stores the configurable preference settings. In the example shown in FIG. 7, the configurable preference settings include audio distribution configurations 736, video distribution configurations 738, scaling configurations 740, and mixing configurations 742. The audio distribution configurations 736 may specify which audio information sources will be directed to which output channels 710. The video distribution configurations 738 may specify which video information sources will be directed to which output channels 710. The scaling configurations 740 may specify whether to attenuate or amplify any given audio information source directed to any given output channel 710. The mixing configurations 742 may specify parameters for mixing video or audio data streams. Examples of mixing configurations for video data streams include whether to render video as a picture within another video, to split the screen horizontally for each video, or to split the screen vertically for each video delivered to the same output channel 710.

The output channels 710 connect to audio reproduction logic 750 and to video reproduction logic 752. The audio reproduction logic 750 may include speakers in the vehicle sound system or headsets, or any other audio reproduction logic. The video reproduction logic 752 may include one or more displays, such as CRT or LCD displays, heads-up displays, such as those drawn on the windshield or other surface, or any other type of video reproduction logic. Any of the audio reproduction logic 750 and the video reproduction logic 752 may include a wireless interface to one or more of the output channels 710.

Figure 8:
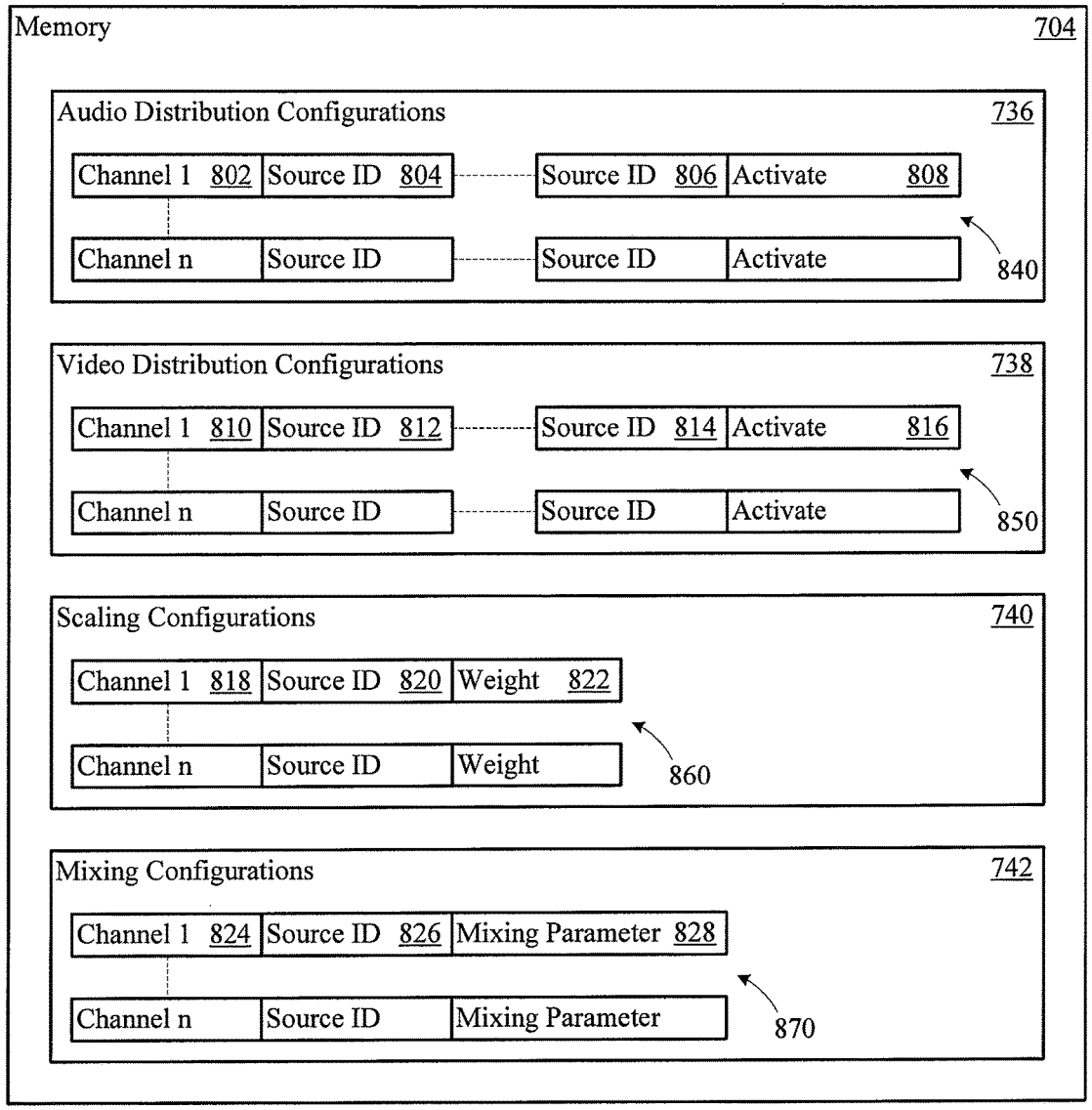
FIG. 8 shows configurable preference settings for a configurable information distribution system.

FIG. 8 shows the configurable preference settings 736-742 in more detail. The audio distribution configurations 736 may include one or more audio configuration entries 840. Each entry 840 may specify a channel identifier 802, and one or more source identifiers (e.g., the source identifiers 804 and 806). In addition, the configuration entry may include activation data 808.

The channel identifier 802 specifies one of the output channels (e.g., the audio output channel 106). The source identifiers 804 and 806 specify the audio information sources (e.g., the information sources 122 and 132) that the system will distribute to the audio output channel. The activation data 808 specifies the conditions under which the configuration entry applies. The activation data 808 may be a time, date, location, passenger identifier, or other specifier. For example, the activation data 808 may specify that the configuration entry applies when a certain passenger is in the car, at a certain time of day, or applies as a default.

The video distribution configurations 738 may include one or more video configuration entries 850. Each entry 850 may specify a channel identifier 810, and one or more source identifiers (e.g., the source identifiers 812 and 814). In addition, the configuration entry may include activation data 816. The channel identifier 810 specifies one of the output channels (e.g., the video output channel 616). The source identifiers 812 and 814 specify the video information sources (e.g., the TV Tuner 618 and DVD player 532) that the system will distribute to the video output channel. The activation data 816 may be provided to specify when the configuration entry applies.

The scaling configurations 740 may include one or more scaling configuration entries 860. Each scaling configuration entry 860 may include a channel identifier 818, a source identifier 820, and a weight 822. The weight 822 specifies how the gain logic 112 and 114 adapts the audio/video data stream that the source identifier 820 specifies for delivery to the output channel that the channel identifier 818 specifies.

For example, the configurable preference settings may specify that the audio output channel 106 will receive both navigation audio data and music audio data. The scaling configurations 740 may then include a scaling configuration entry that specifies that the volume level represented in the navigation data stream 210 will be amplified by 20%, while the volume level represented in the music audio data will be attenuated by 60%. The system thereby enhances the delivery of the navigation information without completely eliminating the music. Activation data for one or more of the scaling configuration entries 860 may also specify when the configuration entry applies.

The mixing configurations 742 may include one or more mixing configuration entries 870. Each mixing configuration entry 870 may include a channel identifier 824, a source identifier 826, and mixing parameters 828. The mixing parameters 828 specify how the system mixes the audio or video data 728 to obtain a combined audio or video output. For example, the mixing parameters 828 may specify that the DVD video obtained from the DVD player 532 should be mixed into the output data stream in a picture-in-picture window. The mixing parameters 828 may specify other parameters, such as window size or position. Activation data for one or more of the mixing configuration entries 870 may also specify when the configuration entry applies.

The scaling configurations 740 and the mixing configurations 742 are examples of information modification configurations. The systems described may implement additional, fewer, or different types of modification parameters. The modification parameters may apply to audio data, video data, sensor data, or any other type of data.

Figure 9:
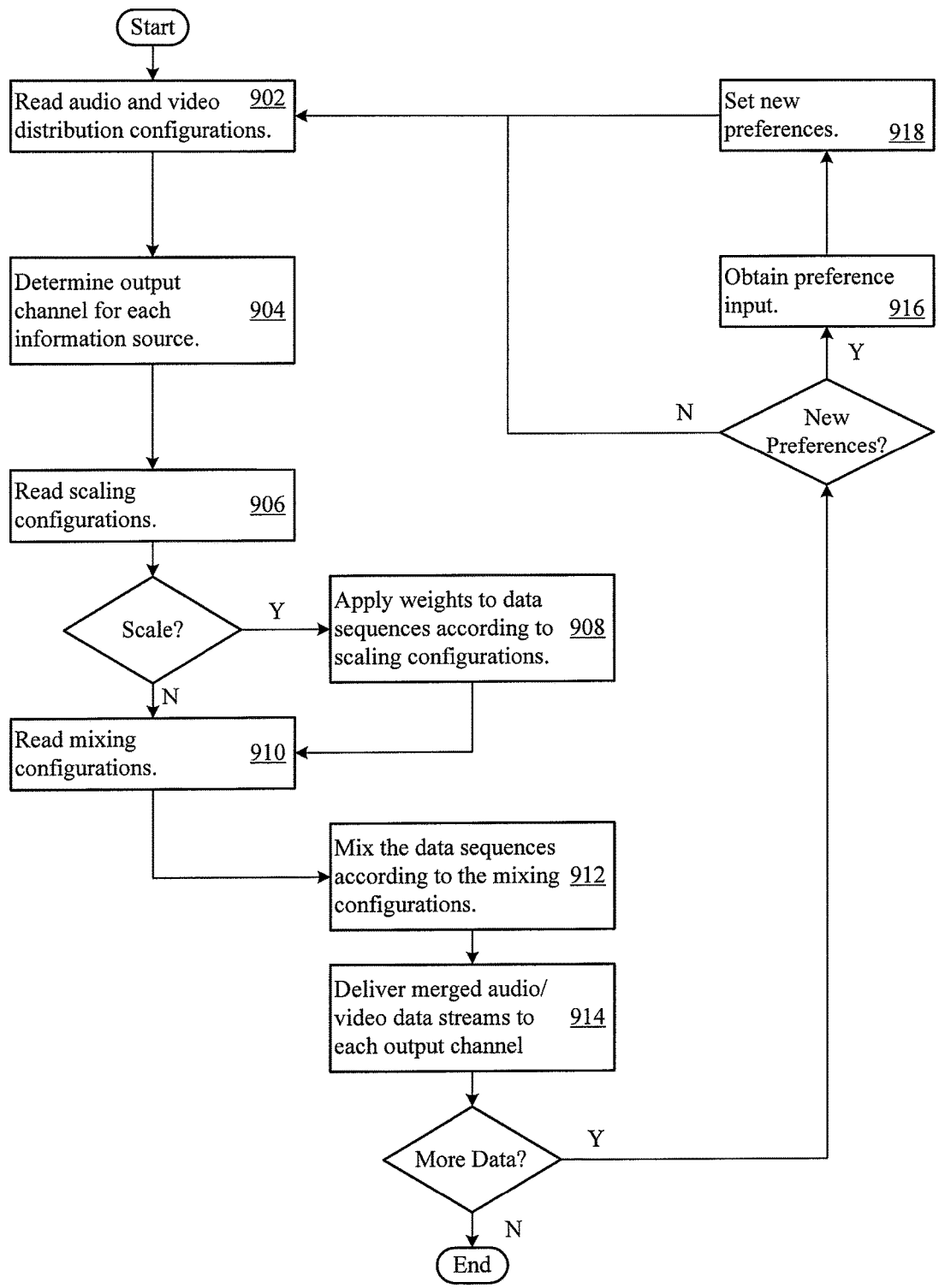
FIG. 9 shows the acts that the configurable information distribution system may take to selectively route information to vehicle passengers.

FIG. 9 shows the acts that the configurable information distribution system 700 may take to selectively route information to vehicle passengers. The routing program 730 reads the audio distribution configurations 736 and the video distribution configurations 738 (Act 902). The routing program 730 examines the identifiers in the configurations 736 and 738 to determine an output channel, if any, for each information source (Act 904).

The scaling program 734 reads the scaling configurations 740 (Act 906). The scaling program 734 examines the identifiers in the scaling configurations 740 to determine which audio data streams to weight and for which output channels the weighting applies. When the scaling configurations 740 specify that a weight should be applied, the scaling program 734 applies the specified weight to the audio data streams (Act 908).

In addition, the mixing program 732 reads the mixing configurations 742 (Act 910). The mixing program 732 combines the audio/video data sequences as specified by the mixing configurations 742 (Act 912). The routing program 730 then delivers the weighted and mixed audio/video data streams to the output channels specified in the audio distribution configurations 736 and the video distribution configurations 738 (Act 914).

The system 700 also checks whether an operator has provided preference input on an operator interface 706. When there are new preferences, the system 700 obtains the preferences (Act 916). The system 700 updates the configurable preference settings 736-742 (Act 918) and continues to route audio/video data to the appropriate output channels.

While various embodiments of the invention have been described, it will be apparent to those of ordinary skill in the art that many more embodiments and implementations are possible within the scope of the invention. For example, the video and/or audio signals may be scaled, mixed, and/or routed with digital or analog circuitry, or with a combination of analog and digital circuitry. The systems may implement additional, different, or fewer audio/video distribution, scaling, or mixing preferences. For example, the system may establish default priority levels for any information source in memory. The priority levels may specify amplification or attenuation levels for any information source (e.g., to emphasize navigation information, emergency information, or traffic reports). As another example, the systems may establish passenger priority preferences that determine which passenger has higher priority control over a radio tuner, television tuner, or other information source. Accordingly, the invention is not to be restricted except in light of the attached claims and their equivalents.

I claim:

1. An information distribution system for a vehicle, comprising:
an input interface operable to receive a plurality of input data streams from at least two different information sources;
a plurality of output channels;
a memory for storing configurable preference settings;
wherein the configurable preference settings comprise distribution configurations, scaling configurations, and combining configurations;
a user interface adapted to establish and/or update any of the configurable preference settings based on user input;
a router operable to deliver portions of the plurality of input data streams as data sequences to the plurality of output channels according to the distribution configurations;

a first plurality of independent gain logics, provided for a first output channel included in the plurality of output channels and operable to scale the data sequences destined for the first output channel according to the scaling configurations to form first scaled data sequences;

a second plurality of independent gain logics, provided for a second output channel included in the plurality of output channels and operable to scale the data sequences destined for the second output channel according to the scaling configurations to form second scaled data sequences; and a plurality of signal combiners operable to combine the scaled data sequences destined for the plurality of output channels into a plurality of combined output data streams according to the combining configurations;

wherein a first portion, comprising at least two data sequences delivered to the first output channel, is different from a second portion, comprising at least two data sequences delivered to the second output channel;

wherein the distribution configurations comprise at least first distribution configurations specifying which input data streams are included in the first portion and second distribution configurations specifying which input data streams are included in the second portion;

wherein the scaling configurations comprise at least first scaling configurations specifying first gains applied to the data sequences included in the first portion and second scaling configurations specifying second gains applied to the data sequences included in the second portion;

wherein the first plurality of gain logics is operable to scale a first data sequence of a first input data stream included in the plurality of input data streams with a first gain value for output on the first output channel, and simultaneously, the second plurality of gain logics is operable to scale the first data sequence of the first input data stream with a second gain value for output on the second output channel;

wherein the first plurality of gain logics and the second plurality of gain logics are operable to scale the data sequences destined for the same output channel independently of each other;

wherein each of the plurality of signal combiners combines scaled data sequences destined for the same output channel into a single combined output data stream; and wherein the router is further operable to completely block delivery of a specific input data stream with respect to all output channels based on at least one of a time, a date, and a user preference.

2. The system of claim 1, where the plurality of input data streams comprise a plurality of input audio data streams, the plurality of output channels comprise a plurality of audio output channels, and the scaling configurations comprise a volume weighting for the data sequences destined for the plurality of audio output channels.

3. The system of claim 1, where the plurality of input data streams comprises a navigation audio data stream.

4. The system of claim 3, where the plurality of input data streams comprises a music audio data stream.

5. The system of claim 4, where the scaling configurations comprise a volume reduction weighting for the music audio data stream.

6. The system of claim 1, further comprising data-to-audio conversion logic connected to the input interface, and where the data-to-audio conversion logic is operable to receive environmental sensor data where the environmental sensor data is received as an input audio data stream at the input interface.

7. The system of claim 6, where the environmental sensor data comprises temperature, speed, or road noise environmental data, or a combination thereof.

8. The system of claim 1, where the distribution configurations and/or the scaling configurations comprise activation data, wherein the activation data specifies conditions under which the configurations apply.

9. A method for information distribution in a vehicle, comprising:

receiving input from a user;

establishing or changing any of configurable preference settings according to the received input, wherein the configurable preference settings comprise distribution configurations, scaling configurations, and combining configurations;

storing the configurable preference settings in a memory;

receiving a plurality of input data streams from at least two different information sources;

reading the configurable preference settings from the memory;

delivering portions of the plurality of input data streams as data sequences to a plurality of output channels according to the distribution configurations;

independently scaling the data sequences destined for a first output channel included in the plurality of output channels according to the scaling configurations to form first scaled data sequences;

independently scaling the data sequences destined for a second output channel included in the plurality of output channels according to the scaling configurations to form second scaled data sequences; and combining the scaled data sequences destined for the plurality of output channels into a plurality of combined output data streams according to the combining configurations;

wherein a first portion, comprising at least two data sequences delivered to the first output channel, is different from a second portion, comprising at least two data sequences delivered to the second output channel;

wherein the distribution configurations comprise at least first distribution configurations specifying which input data streams are included in the first portion and second distribution configurations specifying which input data streams are included in the second portion;

wherein the scaling configurations comprise at least first scaling configurations specifying first gains applied to the data sequences included in the first portion and second scaling configurations specifying second gains applied to the data sequences included in the second portion;

wherein a first data sequence of a first input data stream included in the plurality of input data streams is scaled with a first gain value for output on the first output channel, and simultaneously, the first data sequence of the first input data stream is scaled with a second gain value for output on the second output channel;

wherein the data sequences destined for the same output channel are scaled independently of each other;

wherein scaled data sequences destined for the same output channel are combined into a single combined output data stream; and wherein delivery of a specific input data stream is blocked completely with respect to all output channels based on at least one of a time, a date, and a user preference.

10. The method of claim 9, where the plurality of input data streams comprise a plurality of input audio data streams and the plurality of output channels comprise a plurality of audio output channels;
where receiving comprises:
receiving a navigation input audio data stream;
receiving a second input audio data stream; and
where scaling comprises:
increasing volume of navigation information in the navigation input audio data stream with respect to the second input audio data stream; and
where combining comprises:
combining the scaled navigation input audio data stream and the second input audio data stream to form the single combined output data stream.

11. The method of claim 9, where reading comprises:
reading a scaling configuration comprising a weight from the configurable preference settings; and
where scaling comprises:
scaling information in at least one of the plurality of input data streams according to the weight.

12. The method of claim 9, further comprising:
reading a distribution configuration comprising a channel identifier from the configurable preference settings; and
where delivering comprises:
delivering the portions of the plurality of input data streams to the plurality of output channels according to the channel identifier.

13. The method of claim 12, further comprising:
determining that the channel identifier specifies a wireless receiver; and
transmitting the combined output data stream to the wireless receiver.

14. The method of claim 12, further comprising:
determining that the channel identifier specifies a telecoil; and
transmitting the combined output data stream to the telecoil.

15. The method of claim 9, where receiving comprises:
receiving environmental sensor data.

16. The method of claim 9, where the distribution configurations and/or the scaling configurations comprise activation data, wherein the activation data specifies conditions under which the configurations apply.

* * * * *